United States Patent [19]

Iwanczyk

[11] Patent Number: 4,865,628

[45] Date of Patent: Sep. 12, 1989

[54] METHOD FOR CONFINING AND REMOVING SPRAY DRIFT

[76] Inventor: Louis C. Iwanczyk, 4530 Nantucket/A9, Youngstown, Ohio 44515

[21] Appl. No.: 291,210

[22] Filed: Dec. 28, 1988

[51] Int. Cl.⁴ .............................................. B01D 53/04
[52] U.S. Cl. ............................................ 55/74; 55/97; 55/316; 55/472; 55/DIG. 46; 47/1.7; 98/115.2; 98/115.4
[58] Field of Search ...................... 55/74, 97, 316, 472, 55/473, DIG. 46, 259; 98/115.2, 115.4; 47/1.5, 1.7; 239/120

[56] References Cited

U.S. PATENT DOCUMENTS

| | | | |
|---|---|---|---|
| 3,905,785 | 9/1975 | Fabre | 98/115.2 X |
| 3,926,103 | 12/1975 | Smith | 98/115.2 |
| 4,439,948 | 4/1984 | Brown et al. | 47/1.7 |
| 4,543,319 | 4/1986 | Wolff et al. | 47/1.7 |
| 4,770,088 | 9/1988 | Kistner | 98/115.2 |

Primary Examiner—Charles Hart

[57] ABSTRACT

A method is described for spraying toxic chemicals onto agricultural plants that produces only a small amount of contained drift and then removes this drift from the air polluted.

The environment is not badly damaged, less toxic chemical is used, the probability that a user will injure anyone with toxic spray drift is reduced and spraying work is made more tolerable.

1 Claim, 3 Drawing Sheets

METHOD FOR CONFINING AND REMOVING SPRAY DRIFT

CROSS REFERENCE TO RELATED APPLICATION

Disclosure Document #210567 received by Commissioner of Patents and Trademarks on Sept. 19, 1988.

BACKGROUND FIELD

This invention relates to spraying toxic pesticides, fungicides or bactericides onto agricultural plants. And, specifically, it relates to spray drift, the misdirected fraction of the spray that does not fall on the intended plants.

BACKGROUND OF PRIOR ART

Commerical, agricultural growers spray toxic chemicals on a regular basis, throughout the growing season, to keep from losing their plants and fruit to insects, mites and disease pathogens.

This spray is, generally, in the 500 to 2 micron particles range. While the finer particles result in better leaf coverage, they also drift easily. This fraction of the spray mist that is not applied, to the agricultural plants, is misdirected. It causes excessive, environmental damage. And the errant spray meant to kill plant predators, when they swallow or absorb the poison thru their skins, is a threat to the health of other living beings.

This is a problem when tall-standing plants, such as, grapevines, berry bushes and trees are spayed. Growers are liable, for all injury, to people or their neighbors plants and animals that occur from such drift. But the injured people, often, do not realize who is responsible for their misfortune.

Commercial vineyards in the West are very large, and they are sprayed, usually from the air, using small, lightweight planes. This produces a very high amount of drift.

In the East, the vineyards are smaller, and they are sprayed by apparatus, mounted on a cart, pulled by a utility tractor. The rows, between the grapes, are set at a standard ten foot spacing, in both, the Western and Eastern part of the country. This allows a tractor to move, easily, between the grape rows.

A utility tractor pulling a spray cart will, at the same time, spray the left side of the left-hand row and the right side of the right-hand row. The cart, typically, will carry a piston diaphragm pump driven by a rotating shaft coupled to the tractor's PTO, "Power-Take-Off." The insecticide flows by gravity from a storage tank, thru an inertia trap and filter, to the pump inlet. At the pump outlet, an adjustable, spring-loaded relief valve is used to split the pump flow. The positive, displacement pump always delivers a constant GPM of insecticide; the relief valve, merely, takes the excess flow not required, at the spray nozzles, and vents it back to the storage tank. A gage, at the pump outlet, indicates the static pressure level that is pushing the insecticide solution to the control valves.

When the tractor operator is driving to the vineyard or making U-turns, at the end of each row of grapes, he must have shut-off control to all the spray nozzles. And when the first or last row is being sprayed, he has to be able to shut-off flow to the left side or right side nozzles. Ordinarily, this is done with manual valves, located near the operator's seat. Two high pressure hoses run from a tee fitting, located after the pressure gage, to these valves; then the hoses go back from the valves to the two spray manifolds on the cart.

Insecticide left standing, for some time, in water loses its strength. Fresh spray mixtures are prepared before each application. Wettable, pesticide powder tends to settle to the bottom of a storage tank, therefore, a mechanical agitator is needed to keep it in suspension. The power required to drive the agitator is taken, thru a V-belt and sheave combination, from the utility tractor's PTO.

When the spray nozzles are located on the cart, most of the spray particles, coming out of the nozzles, are too small to have enough thrust to reach the grapevines. And a very environmentally, damaging resort is employed. A large, shrouded, propeller fan is used, at the back of the cart, to pull the air, from behind the cart, and direct it forward towards the tractor. The air strikes a circular plate, placed a few inches in front of the fan, and flairs out, with great velocity, towards the vines. For the two manifolds their spray nozzles are located on the left and right circumference of the plate, respectively. over about a ninety degree quadrant. This strong, artificial wind carries the toxic particles to the grapevines. The top of the round plate has an overhang to keep the air from coming straight up. And the power, to drive the fan, is tapped from the tractor's PTO by a collection of pulleys, V-belts and shafts.

A vineyard being sprayed with insecticide solution, at the rate of IO GPM with the assist of a 25,000 CFM fan, will have about 25% of the chemical blown around as dry, recrystallized powder. In other words, the forced, fan air has evaporated away 25% of the water holding the chemical in solution before it reaches the vines.

The scent of toxic drift permeates the air, after a tractor operator has sprayed but a few yards of grapevines. The chalky, white powder is not only on the plants, but everywhere else besides. At this time, only waterproof clothing and a respirator mask will, adequately, protect the operator when commercial-strength insecticides, fungicides and bactericides are sprayed. And EPA regulations and State license required them. But on hot, muggy days, the tractor operator will not wear them; they're intolerable. And the estate manager will pretend not to notice, so that the work will get done.

OBJECTS AND ADVANTAGES

My invention has the following, (a) It does a minimum amount of damage to the environment. Most of the residue, after spraying, is left on the intended plants; not in the air.

(b) It uses less pesticide. Unlike prior art, it loses less chemical to drift.

(c) It does not require the sprayer to wear protective clothing, and the work becomes more tolerable.

(d) It reduces a grower's legal liability by leaving the sprayed premises and the surroundings in a safe condition.

DRAWING FIGURES

Figure 1:
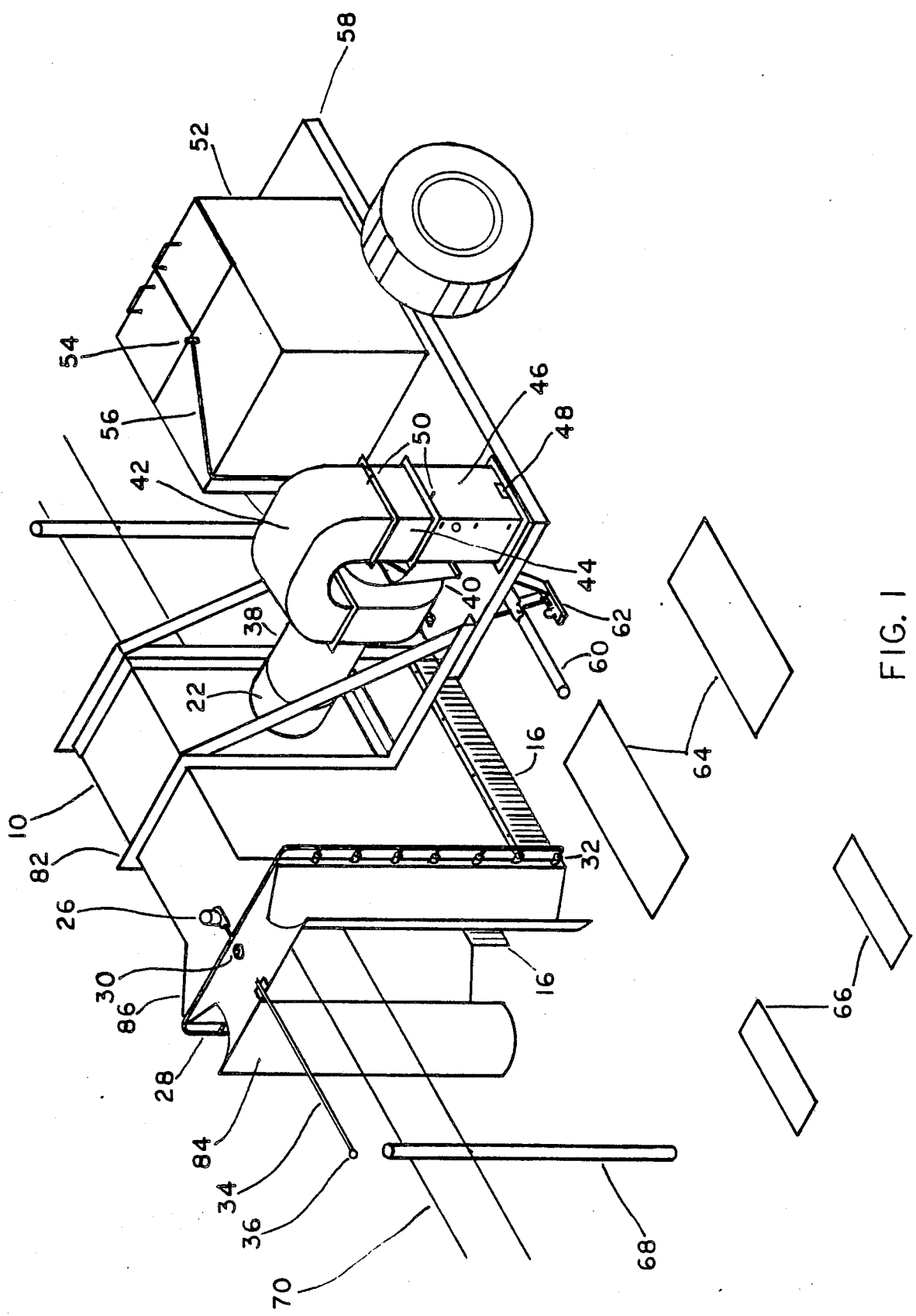
FIG. 1 depicts the invention being used to spray a vineyard.
Figure 2:
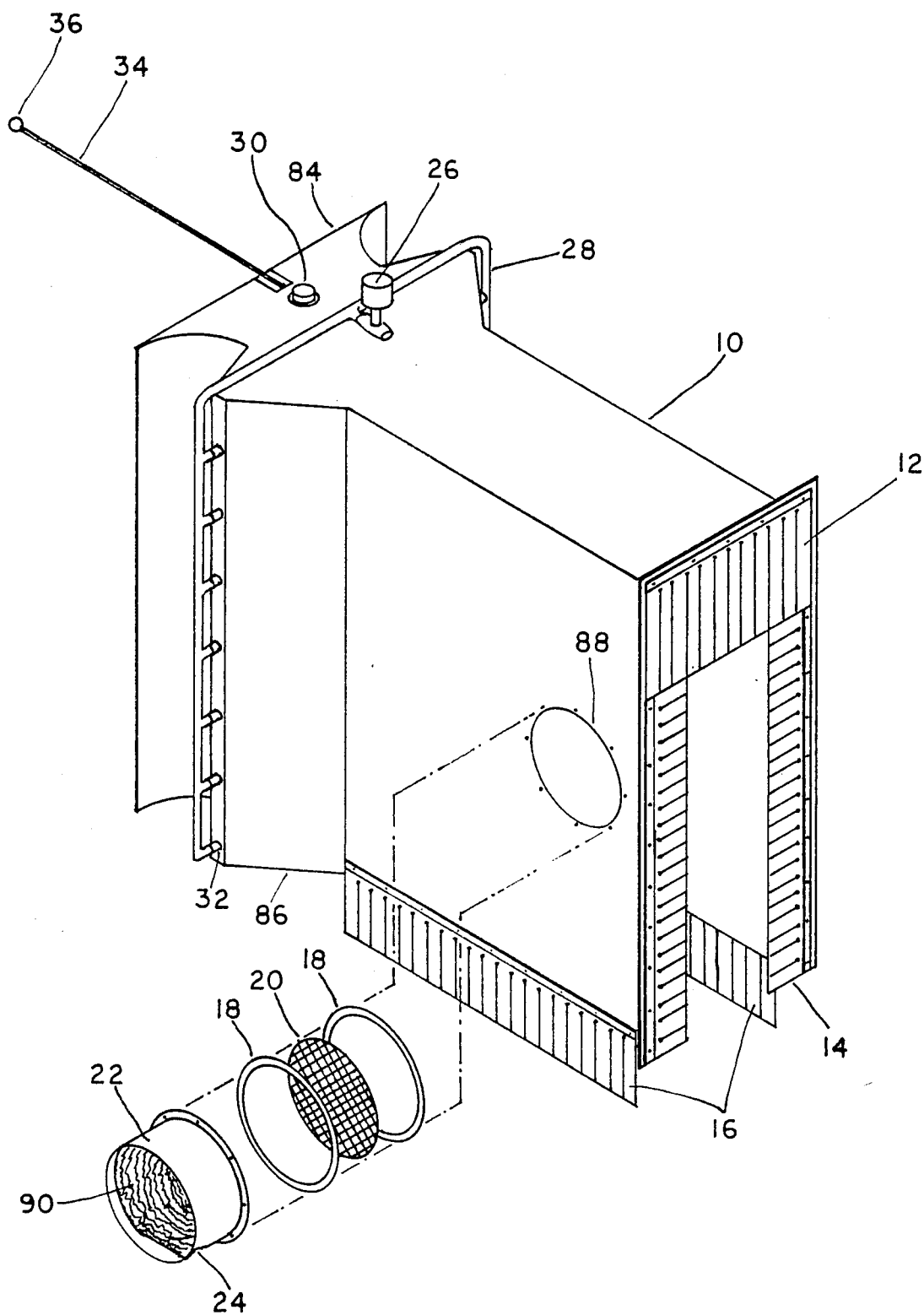
FIG. 2 shows the details of the drift confining portion of the invention.
Figure 3:
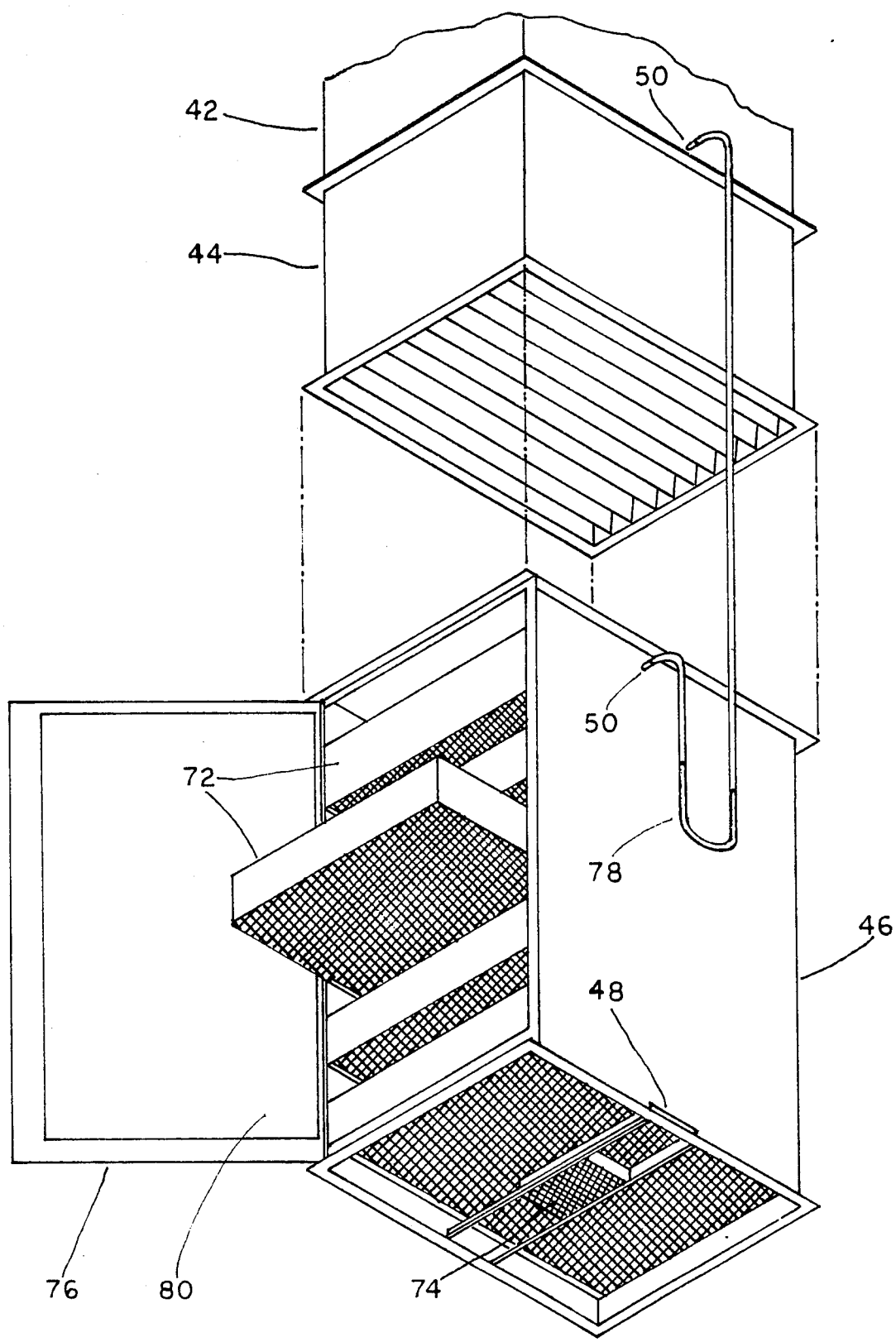
FIG. 3 shows the details of the drift removing portion of the invention and the maintenance equipment.

DRAWING REFERENCE NUMERALS:

10 hood
12 curtain at top of hood
14 fingers on hood's side
16 curtain at bottom of hood
18 gasket
20 screen
22 demister can
24 bump on demister can for drainage
26 solenoid valve
28 spray manifold
30 housing for electrical switch
32 spray nozzles
34 guide rod
36 guide ball
38 duct
40 blower
42 header duct
44 filter
46 activated charcoal container
48 drawer for insect box
50 static pressure taps
52 storage tank
54 agitator shaft
56 flexible cable in cover
58 cart
60 shaft to tractor's PTO
62 hitch
64 shadow of tractor's back wheels
66 shadow of tractor's front wheels
68 grapevine post
70 grapevine wire
72 tray for activated charcoal
74 insect box
76 door
78 test manometer
80 foam rubber gasket
82 structure
84 inlet for hood
86 Vee bulge on hood
88 hole in hood
90 wire mesh

DESCRIPTION OF THE INVENTION

My invention is depicted in FIG. 1 spraying a typical vineyard. To show the apparatus more clearly, however, the grapevines, utility tractor, and spray pump is not shown. But the insecticide storage tank 32 is shown to give a better indication of size.

The invention uses a moving hood 10 suspended over the grapes and posts 68, to confine the drift, as both sides of one plant row are sprayed, while enclosed by hood 10. This is equivalent, to the present practice, of spraying the left side of the left-hand row and the right side of the right-hand row. The hood IO is cantilevered, by structural support 82, from one side of spray cart 58. The position of a utility tractor pulling the cart 58 is shown by shadows of its front wheels 66 and back wheels 64. The tractor is attached to cart 58 by a hitch 62.

A bell-mouth inlet 84, on the U-shaped hook IO, is used to gently compress the lateral off-shoots of the vines, to the inside, without damaging them when the hood 10 is pulled along the plant row. A Vee shaped bulge 86, on both sides of hood 10, contains a series of spray nozzles 32 at the point of the Vees 86. These bulges 86 provide the distance, away from the grape leaves, required to, thoroughly, spray the plant. The nozzles 32 and the centerline of the Vees 86 are inclined, slightly, to the rear of hood 10 to keep spray mist from coming out of inlet 84.

A solenoid valve 26, normally-closed, is placed on top of hood 10 to control the flow into the side manifolds 28. A housing 30, holding an electrical switch, is mounted on top of inlet 84. A flexible wire, hanging down from the switch lever, closes the switch when the inlet 84 passes over posts 68 or the vines. This allows current to flow thru the valve's solenoid and open valve 26. This automatic feature allows the tractor operator to concentrate on keeping hood 10 centered over the top wire 70, nailed to posts 68. To farther aid him, a guide ball 36 attached to rod 34 is cantilevered from the top of inlet 84.

A blower 40 on cart 58, constantly, pulls the drift from hood 10. The toxic air is pulled, thru demister 22 and duct 38, by the negative static pressure generated at the inlet of blower 40 when its 40 impeller rotates. The positive static pressure, at the outlet of blower 40, forces the drift thru header duct 42, a pleated paper filter 44, and activated, charcoal container 46. Here the toxic vapor is removed from the air. The clean air then passes, thru an opening in the floor of cart 58, back into the vineyard.

A rotating shaft 60, attached to a utility tractor's standard, 540 RPM, PTO, drives the impeller of blower 40 thru a collection of V-belts, pulleys and auxiliary axles. Shaft 60, thru the same type of mechanisms, also powers the insecticide pump and agitator.

Storage tank 52 is made rectangular in shape to conserve space, and to lower the center of gravity for the cart 58. Prior art spray carts generally, have cylinderical tanks.

FIG. 2 shows the drift confining portion of the invention in detail. All of it is located on the suction side of blower 40.

A short, supple curtain 12 is hung from the top of hook 10, at its rear, and curtain 16 is hung from the bottom edges of both sides, after the Vee bulges 86. In addition, short, flexible fingers 14 are attached towards the inside of hood 10. The slotted curtains 12, 16 and fingers 14 block off unwanted air openings to the hook 10 and force more of the air to enter thru the inlet 84. This results in a more thorough sweep of drift out of hook 10.

The polluted air exits the hood 10 thru hole 88, screen 18, and demister 22. The demister can 22, filled with wire mesh 90 is located after screen 20. Screen 20, on hole 88, prevents the grape leaves and vines from tearing off as hood 10 moves. Mesh 90 removes from the air, entering duct 38, any liquid droplets it may contain. The droplets wet mesh 90 and the coalesced liquid flows down to the bottom of can 22. A sloped, flat spot 24, bumped into the bottom of can 22, drains any liquid collected back into hood 10. Gaskets 18 seal the connection of demister can 22 and screen 20 to hole 88.

FIG. 3 shows the drift removal portion of the invention and the maintenance equipment required to insure the apparatus is working properly. All of it is located on the positive pressure side of blower 40.

Exploded view, FIG. 3, shows header duct 42, paper filter 44 and charcoal container 46. The paper filter 44 is used to remove the dust and dry, chemical powder from the air. Static pressure taps 50, which are normally capped off, are used to check the operating condition of filter 44. A clear, plastic tube manometer 78, filled with a few inches of water, is attached to taps 50. When the blower 40 is running, if the indicated pressure drop across the filter 44 exceeds the manufacturer's allowable amount, filter 44 has to be replaced.

A door 76 allows trays 72, holding activated charcoal, to slide into container 46. A foam rubber gasket 80, on door 76, firmly seats the trays into place when door 76 is closed. Trays 72 have a removable screen on top and a fixed screen on the bottom. This permits the equipment owner to, economically, replace spent charcoal from a supply drum. The drawer 48, on the bottom of container 46, is used to hold a box of insects. These insects are trapped, on the premises of the area to be sprayed, and placed in screen box 74. After spraying, if the insects are alive the air in the vineyard is safe. But if they are dead, the activated charcoal has to be replaced. With experience, the user's logbook will indicate how often the charcoal has to be replaced for the various toxic chemicals used.

In summary, my invention reduces the amount of toxic drift made by prior art spraying. It does this thru spraying close to the plants. Only the air pulled into the hood gets saturated with insecticide. In addition, the air from the hood is cleaned of poison before it is allowed back into the premises.

Although the preceeding discussion, specifically, calls for activated charcoal, as the toxic removing compound, this does not preclude the use of other gas absorbing compounds in container 46.

The apparatus was shown in a vineyard spraying operation. But it can be used to spray berry bushes, nursery trees and other tall standing plants.

If the distance, between plant rows, is accurately maintained, an additional hood, on the opposite side of the cart, can be used. This would cut in half the time needed to spray. And it would counterbalance the hood on the other side of the cart. The single hood requires a counterbalance weight on the cart.

In an alternative embodiment of the hood, it may be made with lightweight tubing and waterproof cloth loosely stretched over the tubular frames. And the sides of the hood can be made adjustable.

I have explained the principle of my invention, and illustrated what I now consider its best embodiment. But it must be understood that, within the scope of the appended claim, the invention may be practiced otherwise than as, specifically, illustrated and described.

I claim:

1. A method of confining and removing drift from agricultural sprays, comprising of the following steps:

(a) attaching a hood to spray nozzles so that said hood covers said nozzles and confines the spray drift without impeding the movement of said nozzles along a line of plants and (b) evacuating said drift from said hood by means of the negative, static pressure created, at the inlet, of a rotating blower impeller and (c) removing the toxic chemicals from said drift, to governmental approved safe limits, by forcing said drift thru gas removing compounds by means of the positive, static pressure created, by said rotating blower impeller, at the outlet of said impeller.

* * * * *